US011524850B2

(12) United States Patent
Eckes et al.

(10) Patent No.: US 11,524,850 B2
(45) Date of Patent: Dec. 13, 2022

(54) TREATMENT DEVICE AND CONTAINER TREATMENT MACHINE

(71) Applicant: KHS GmbH, Dortmund (DE)

(72) Inventors: Sebastian Eckes, Sprendlingen (DE); Kai Krähenbiel, Dransfeld (DE)

(73) Assignee: KHS GmbH, Dortmund (DE)

( * ) Notice: Subject to any disclaimer, the term of this patent is extended or adjusted under 35 U.S.C. 154(b) by 678 days.

(21) Appl. No.: 16/606,661

(22) PCT Filed: Feb. 6, 2018

(86) PCT No.: PCT/EP2018/052848
§ 371 (c)(1),
(2) Date: Oct. 18, 2019

(87) PCT Pub. No.: WO2018/197063
PCT Pub. Date: Nov. 1, 2018

(65) Prior Publication Data
US 2022/0242680 A1     Aug. 4, 2022

(30) Foreign Application Priority Data

Apr. 26, 2017 (DE) ............. 10 2017 108 903.9

(51) Int. Cl.
*B65G 47/82* (2006.01)
*B08B 9/08* (2006.01)

(52) U.S. Cl.
CPC .......... *B65G 47/82* (2013.01); *B08B 9/0804* (2013.01); *B08B 9/0826* (2013.01); *B65G 2201/0235* (2013.01); *B65G 2201/0241* (2013.01); *B65G 2203/00* (2013.01); *B65G 2203/0233* (2013.01); *B65G 2203/044* (2013.01)

(58) Field of Classification Search
CPC .... B65G 47/82; B65G 47/842; B65G 47/845; B65G 2201/0241; B65G 2201/0252; B65G 2203/0233; B65G 2203/044; B08B 9/0804; B08B 9/0826; B08B 9/205; B08B 9/42; B08B 9/423; B08B 9/426; B08B 9/44

See application file for complete search history.

(56) References Cited

U.S. PATENT DOCUMENTS

| | | | |
|---|---|---|---|
| 2,924,484 A | | 2/1960 | Tolsma |
| 3,370,720 A | * | 2/1968 | Schickle ............... B08B 9/0804 |
| | | | 414/277 |

(Continued)

FOREIGN PATENT DOCUMENTS

| | | |
|---|---|---|
| DE | 3535615 | 4/1987 |
| DE | 102013207091 | 10/2014 |
| EP | 2792626 | 10/2014 |

(Continued)

*Primary Examiner* — Gene O Crawford
*Assistant Examiner* — Keith R Campbell
(74) *Attorney, Agent, or Firm* — Occhiuti & Rohlicek LLP (57) ABSTRACT

An apparatus for treating containers includes a transporter that moves containers along a transport direction, a displacer, and a treatment device with two treatment positions. The displacer has three arms that move transverse to the transport direction. The arms are driven independently such that two of the three arms contact bearing points on opposite sides of a container. These two arms move synchronously to displace the container between the transporter and one of the treatment positions.

16 Claims, 4 Drawing Sheets

(56) References Cited

U.S. PATENT DOCUMENTS 3,773,163 A * 11/1973 Ruddick ................ B65G 23/00
198/597
9,085,421 B2 * 7/2015 Ford ...................... B65G 47/82

FOREIGN PATENT DOCUMENTS

| EP | 2792626 A1 * | 10/2014 | ............. B65G 47/71 |
| JP | H08133470 | 5/1996 | |
| WO | 2016050825 | 4/2016 | |

* cited by examiner

Fig. 3

TREATMENT DEVICE AND CONTAINER TREATMENT MACHINE

RELATED APPLICATIONS

This is the national stage of PCT application PCT/EP2018/052848, filed on Feb. 6, 2018, which claims the benefit of the Apr. 26, 2017 priority date of German application DE 10 2017 108 903.9, the contents of which are herein incorporated by reference.

FIELD OF INVENTION

The present invention relates to a treatment device for treating containers, such as cans, barrels, or kegs, along a treatment section.

BACKGROUND

It is known to use a container-treatment machine for cleaning a container's interior and for filling it with a liquid filling-product.

Such container-treatment machines often include a transporter and a treatment device.

The transporter conveys containers along a treatment section in a transport direction.

The treatment device extends along the transport direction and across a transverse direction. A typical treatment device includes treatment positions at which the containers are treated. These are often mutually opposed treatment positions arranged laterally with one on each side of the transporter. It is here that containers can be treated.

A typical container-treatment device of the foregoing variety typically has some way to move containers from the transporter to the treatment position and back to the transporter. These devices are tuned for moving a particular type of container with a particular geometry. If the container-treatment device is called upon to handle another type of container, the container-displacement element will no longer work.

SUMMARY

An object of the invention is to provide a container-treatment that displaces containers of the widely differing geometric dimensions without the need to carry out time-consuming adjustment.

In one aspect, the invention features a container-treatment device for treating containers, such as cans, barrels, and kegs. The container-treatment device comprises at least two treatment positions in which the containers are treated. The treatment positions face each other on opposite sides of a transporter. The container-treatment machine also includes displacer in the vicinity of the treatment device. The displacer, which is drive by a motor, displaces a container from the transporter to a treatment position, and then back to the transporter. The displacer has at least three arms for displacing the containers. The arms are arranged transverse to the transport direction. Motors displace the arms independently of each other. To displace a container, two of the three arms rest against bearing points on opposite sides of the container's outer. The two arms are then moved in synchrony with each other.

The independently movable arms provide a way to easily accommodate containers of widely differing shapes and sizes, and in particular, to widely varying container diameters. As a result, it is no longer necessary to have format parts that adapt an apparatus to different container formats.

It is possible, even having positioned a first container at a first treatment position, for one of arms to remain in a dwell position in the vicinity of the first treatment position and to use two other arms to displace a second container to a second treatment position that is located opposite the first treatment position. The second container need not be the same size or shape as the first container.

The presence of three independently-moveable arms thus offers the advantage of considerable flexibility because, at every moment that a handling device is being occupied, there will always be two arms available for displacing containers. This also makes it possible for one transporter to both delivery containers and to take them away.

In some embodiments, a motor controls the three arms independently of each other so that they can be displaced in a regulated manner.

Some embodiments implement single or multi-step load recognition for recognizing when the arms experience corresponding loads. This information can be used to as a basis for controlling the motors. In some embodiments, load recognition includes torque recognition.

In some embodiments, each arm has a pair of centering elements at the contact points to promote centering of a container with which the arm comes into contact. Among the embodiments are those in which centering elements are configured as rollers that are oriented such that longitudinal axes of the rollers extend perpendicular to a transport plane on which containers are transporter. The centering elements can be cylindrical or they can have another suitable transverse cross-section contour. Among the embodiments are those in which the centering elements define a triangular cross section.

Some embodiments feature centering elements that are arranged to be rotatable about a longitudinal axis. Among these are embodiments in which centering elements from a pair of centering elements are spaced from each other in the transport direction.

Some embodiments include a sensor located at a centering element of an arm. Among these are embodiments in which the sensor is a pressure sensor and those in which it is a position sensor.

Other embodiments include plural treatment devices located along the treatment section. Each treatment device includes at least two mutually-opposed treatment positions located on either side of the transporter.

In other embodiments, each treatment device includes an inspector for visual monitoring of a container that has been moved into a treatment position.

In other embodiments, the treatment device includes, at one of its treatment positions, an optical sensor for determining the dimensions of the container. Examples of such dimensions include a container's outer diameter and a container's height.

In another embodiment, the treatment device includes a lock-type access point for at least one of its treatment positions.

Other embodiments include those in which three or more arms are arranged on a rail-shaped guide that is common to all of the arms. These arms are independently displaceable from each other.

Other embodiments include a carriage. In these embodiments, a holding section arranges three independently moveable arms on correspondingly assigned carriage. A guide guides the carriage and a motor causes the carriage to be displaced transverse to the transport direction.

In some embodiments, the transporter is configured as a constituent part of the treatment device. Among these are embodiments in which the transporter and the treatment device are securely connected together and those in which the transporter and the treatment device are integrated into a single structure.

As used herein, expressions such as "essentially" and "approximately indicate deviations from an exact value to an extent that is insignificant to function. In some cases this would correspond to a deviation of ten percent and in other cases this would correspond to a deviation of five percent, in both cases the deviation being above or below a nominal value.

Further embodiments, advantages, and possible applications of the invention are also derived from the following description of exemplary embodiments and from the figures. In this context, all the features described and/or represented in the figures are in principle the object of the invention, individually or in any desired combination, regardless of their arrangement in the claims or reference to them. The contents of the claims are also a constituent part of the description.

The invention is explained in greater detail hereinafter on the basis of the figures, by reference to exemplary embodiments. The figures show.

BRIEF DESCRIPTION OF THE DRAWINGS

Identical reference numbers are used in the figures for elements that are the same or have the same effect. each figure, reference numerals are shown only for structures that are discussed in connection with that figure.

DETAILED DESCRIPTION

Figure 1:
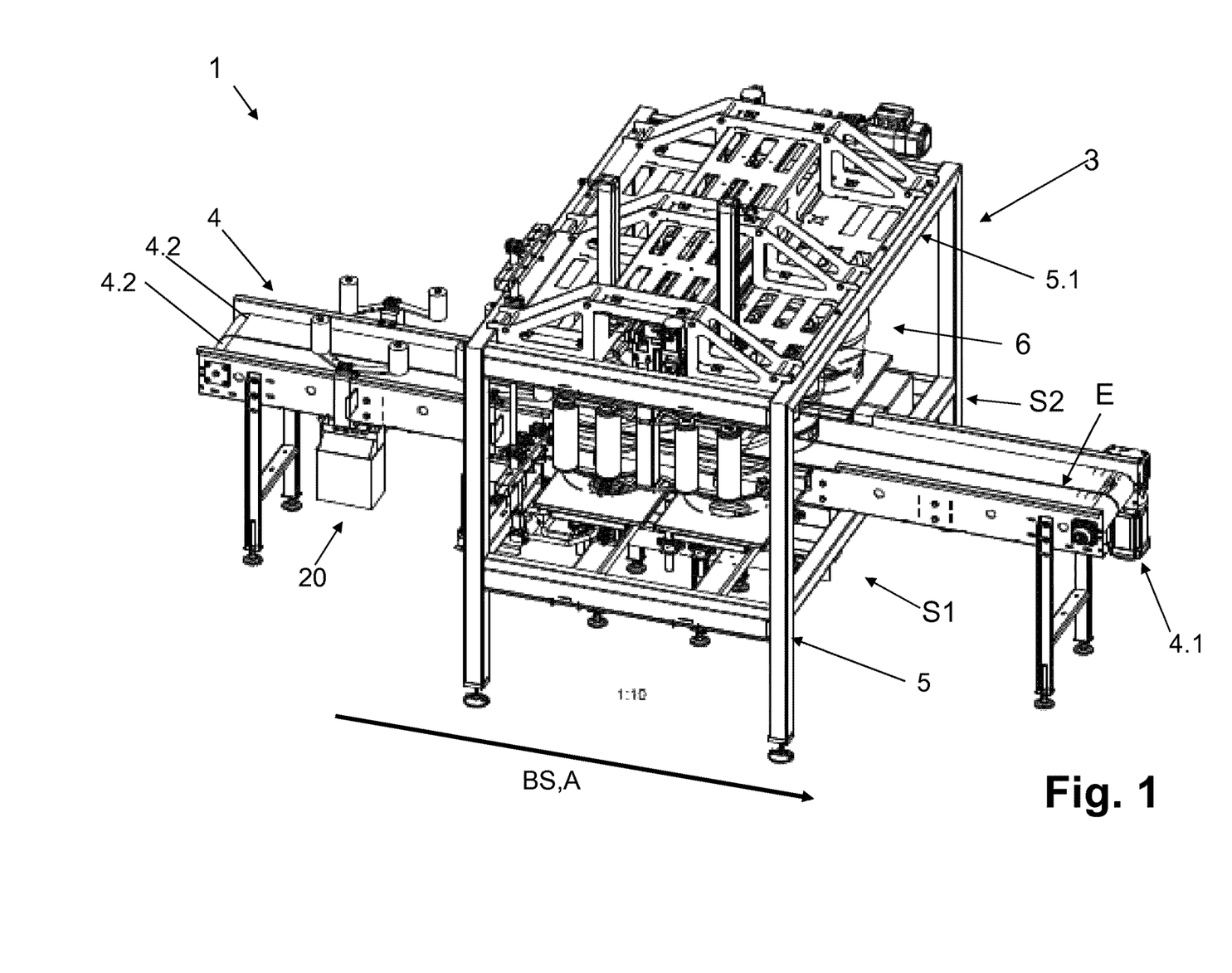
FIG. 1 shows a perspective view of an embodiment of a container-treatment device with a displacer.

FIG. 1 shows a container-treatment machine 1 for treating containers 2. In some embodiments, the containers 2 are kegs with fittings. The kegs are either disposable or reusable. In other embodiments, the containers 2 are keg barrels or large cans. Typical volumes for containers 2 are between five liters and fifty liters.

Figure 2:
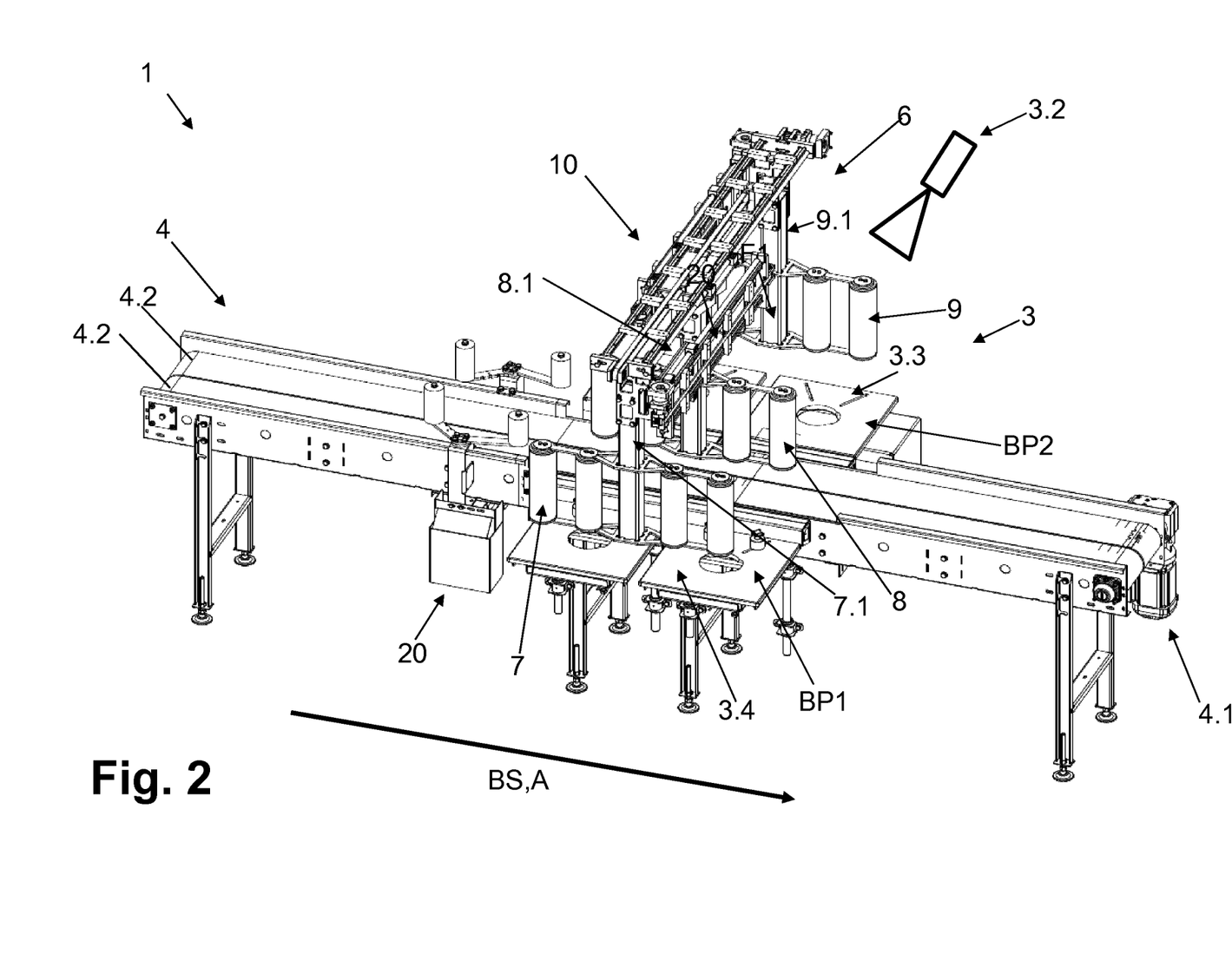
FIG. 2 shows a perspective view of the container-treatment device of FIG. 1 with its displacer partially revealed.

Examples of a container-treatment machine 1 include cleaning machines for cleaning a container's interior, filling machines for filling a container with a fluid filling-product, and sterilizing machines. These functions take place at a treatment device 3 that is arranged along a treatment section BS and that extends transversely to a transport direction A. In particular, these functions take place at first and second treatment positions BP1, BP2 as shown in FIG. 2.

In general, a container-treatment machine 1 includes more than one treatment device 3. In some embodiments, each treatment device 3 carries out a different stage in a multi-stage container treatment.

The first and second treatment positions BP1, BP2 face each other on either side S1, S2 of the transporter 4. The first treatment position BP1 is located on a first side S1 of the transporter's longitudinal axis and the second treatment position BP2 is located on a second side S2 of the longitudinal axis opposite the first side and opposite the treatment position BP1. The container-treatment machine 1 also includes a transporter 4 for delivering containers 2 towards and away from a treatment section BS that extends along a longitudinal axis of the transporter 4.

The transporter 4 conveys containers in a transport direction A along the treatment section BS. In some embodiments, at least one transporter 4 is a constituent of the treatment device 3. In some of these embodiments, the transporter 4 securely connects to the treatment device 3. In others of these embodiments, the treatment device 3 and the transporter 4 form one integral structure.

In some embodiments, the transporter 4 is a motor-drive endless conveyor. In the example shown, the transporter 4 features two parallel endless conveyor belts 42 and a motor drive 4.1 that drives both of the conveyor belts 42. These conveyor belts 42 form a common transport plane E for containers.

There also exist transporters arranged upstream or downstream of the illustrated transporter 4. These transporters, which have been omitted from the figure, deliver containers 2 to the treatment section BS and remove containers from the treatment section BS.

Some embodiments of the container-treatment machine 1 have an individualizer 20 upstream of the treatment device 3. The individualizer 20 stops individual containers from being conveyed by the transporter 4 and, after a brief interval, releases them again so that the transporter 4 can again convey them.

The treatment device 3 includes a machine frame 5 that accommodates the treatment positions BP1, BP2 and other components of the treatment device 3. The machine frame 5 includes a transverse element 5.1 that extends transversely across and over the transporter 5 above the transporter plane E so that containers 2 can be conveyed underneath it.

The transverse element 5.1 forms a rectangular prism that defines a frame section of the machine frame 5 and that extends over the transporter 4 with its longitudinal sides and at a right angle relative to the transport direction A, over the transporter 4. In this embodiment, the transverse element 5.1 projects on both sides over the two longitudinal sides of the transporter 3.

At each treatment position BP1, BP2, a treatment head is positioned to interact with a container 2 that is centered below the treatment head.

In some embodiments, the treatment head interacts with a fitting on a keg. Among these are embodiments in which the treatment head comprises a valve that can be connected to the fitting of a corresponding keg. When connected, the valve permits the keg's interior to be cleaned with any of a variety of cleaning media, such as acid, alkali, steam and/or water. In the case of a filling machine, the valve permits the keg to be filled with a liquid filling product.

In some embodiments, the treatment device 3 includes an inspector 3.2 at one or more of the treatment positions BP1, BP2. Among these are embodiments in which the inspector 3.2 includes a camera that is used to inspect the container 2. This is useful for determining the type of keg or the height of the keg. Such information can then be transferred to a suitable controller, such as a central control unit.

In other embodiments, the treatment device 3 includes a sensor 3.3 that is configured to determine container geometry, including dimensions of the container, such as the container's height or the container's outer diameter In some embodiments, the treatment device 3 features a lock-type access point at one or more of the first and second treatment positions BP1, BP2. At a lock-type access point, no treatment of a container takes place. The lock-type access point 3.4 therefore forms a waiting position or dwell position for a container 2 at the treatment position BP1, BP2.

The container-treatment machine also includes a displacer 6 in the vicinity of the treatment device 3. A motor drives the displacer 6 and thus causes it to displace containers 2 from the transporter 4 to a treatment position BP1, BP2 and then back to the transporter 4. In those cases in which plural treatment devices 3 exist along the treatment section BS, it is possible to assign one displacer 6 to each treatment device 3.

Figure 3:
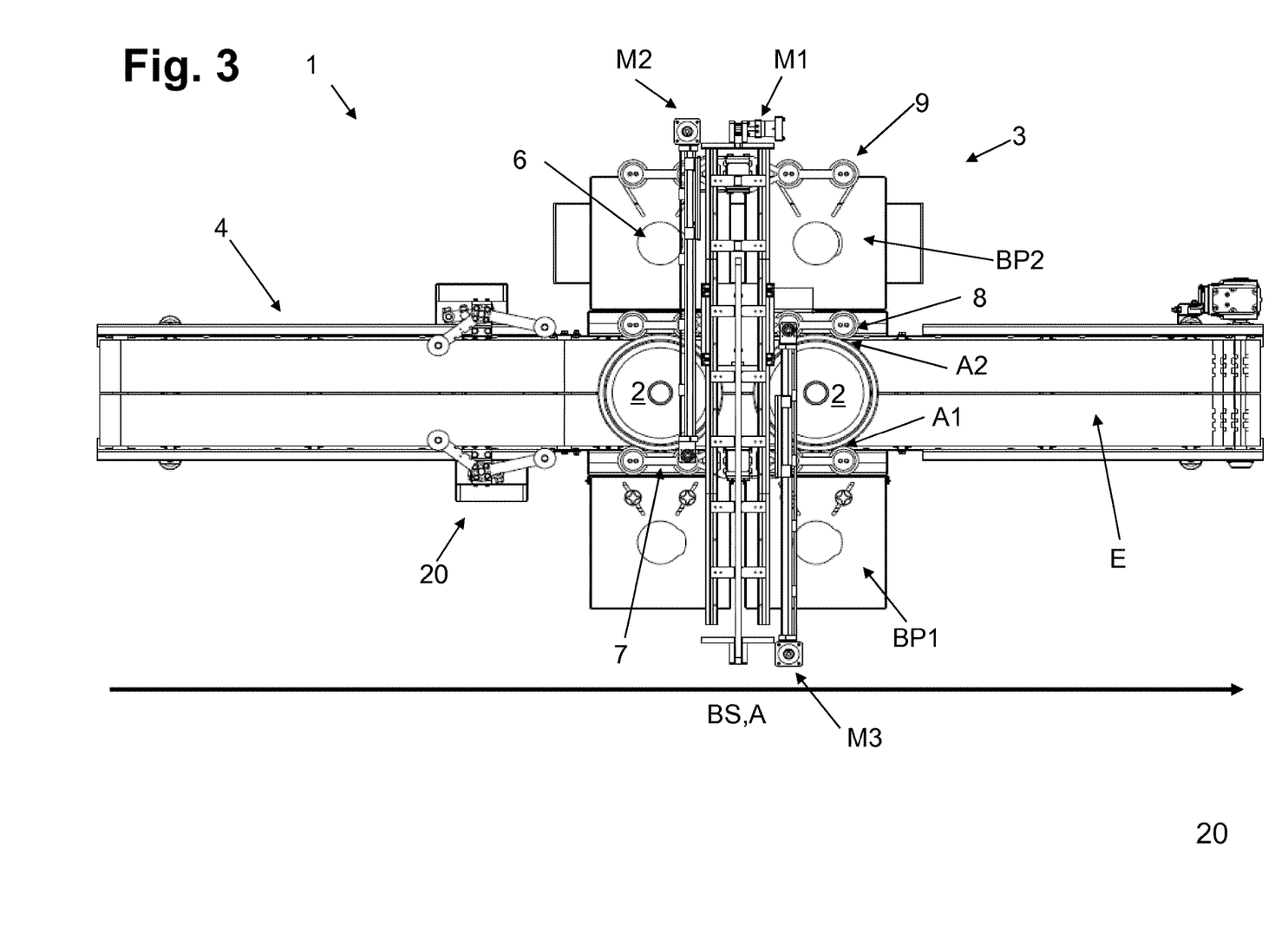
FIG. 3 is a view from above the container-treatment device of FIGS. 1 and 2 with the displacer partially revealed.
Figure 4:
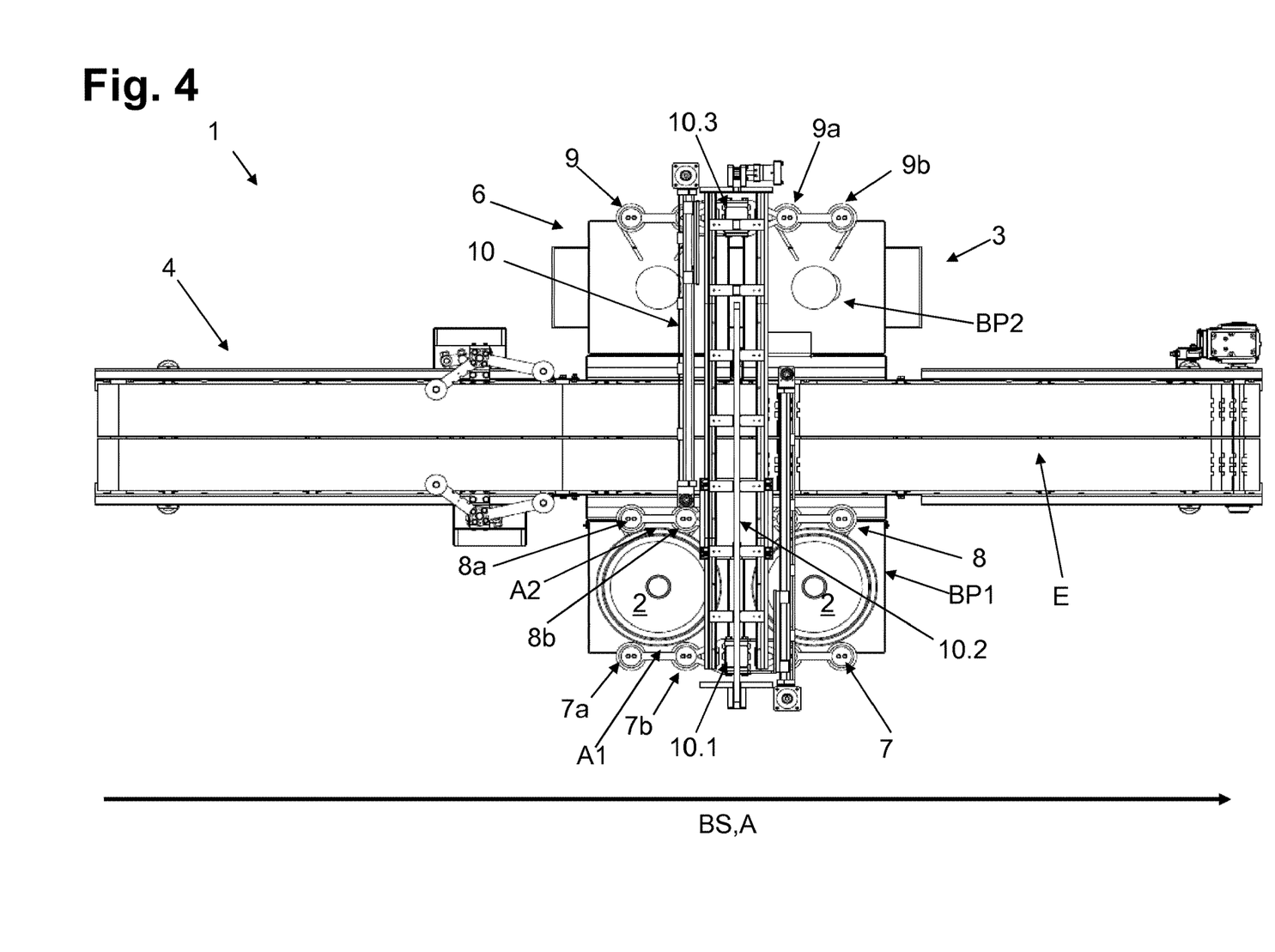
FIG. 4 shows the container-treatment device of FIG. 3 after execution of a displacement transverse to the transport direction.

Referring to FIG. 2, the displacer 6 includes at least first, second, and third parallel arms 7, 8, 9 for displacing containers 2. The first, second, and third arms 7, 8, 9 are arranged to move transverse to the transport direction A and are displaceable independently of each other by one or more motors. As shown in FIGS. 3 and 4, the first, second, and third arms 7, 8, 9 are used in pairs to contact bearing points A1, A2 on opposite sides of a container's outer surface. Arms that have engaged a container 2 are then made to move in synchrony.

The displacer 6 also includes a guide 10 arranged at the transverse element 5.1 of the machine frame, for example by being integrated into the transverse element 5.1. In some embodiments, the guide 10 takes the form of a rail. Holding sections 7.1, 8.1, 9.1 connect corresponding arms 7, 8, 9 to the guide 10. In the illustrated embodiment, the holding sections take the form of rods or arms. The holding sections 7.1, 8.1, 9.1 permit the corresponding arms 7, 8, 9 to move independently in a direction transverse to the transport direction A.

In some embodiments, the holding sections 7.1, 8.1, 9.1 are arranged on corresponding separate carriages 10.1, 10.2, 10.3. The guide 10 guides the carriages 10.1, 10.2, 10.3 perpendicular to the transport direction A. Each carriage 10.1, 10.2, 10.3 is driven by a motor that can be controlled and regulated to move the carriage 10.1, 10.2, 10.3 forwards or backwards along a direction that is transverse to the transport direction A.

FIG. 3 shows first, second, and third motors M1, M2, M3 that drive corresponding first, second, and third carriages 10.1, 10.2, 10.3 using corresponding separate belt drives. A suitable belt drive is a toothed belt drive. The motors M1, M2, M3 drive the carriages 10.1, 10.2, 10.3 along the guide 10 in a controlled and/or regulated manner. In some embodiments, each motor M1, M2, M3 is a servomotor. In others, each motor M1, M2, M3 is an electromagnetic direct drive.

A variety of mechanical couplings can be used between a motor M1, M2, M3 and the carriage 10.1, 10.2, 10.3 that it drives. A suitable coupling is a threaded spindle. I Referring to FIG. 3, each arm 7, 8, 9 includes a pair of mutually opposed bearing points A1, A2 that are used for synchronous displacement of a container 2. As shown in FIG. 4, each bearing point A1, A2 comprises a pair of centering elements 7a, 7b, 8a, 8b, 9a, 9b that firmly contact an outer surface of a corresponding container 2 so as to center the container 2 during displacement thereof.

A particularly useful implementation of a pair of centering elements 7a, 7b, 8a, 8b, 9a, 9b is as a pair of cylindrical rollers that are spaced apart along the transport direction A and that have parallel axes of rotation that are oriented perpendicular to the transport plane E.

In some embodiments, each pair of centering elements 7a, 7b, 8a, 8b, 9a, 9b includes an associated sensor. Examples of such sensors include pressure sensors and position sensors. A controller controls or regulates the operation of the container-treatment machine 1. The controller in some embodiments is a constituent part of the container-treatment machine 1. The controller controls all components of the container-treatment machine including the filling valves, the inspector 3.2, the sensor 3.3, the various motors 4.1, M1, M2, M3, and the sensors. FIGS. 3 and 4 show the container-treatment machine 1 from above with the displacer 6 only partially represented. The machine frame 5 has been omitted for clarity.

FIG. 3 shows the container-treatment machine 1 in a treatment position in which the containers 2 are still on the transporter 4 with their container vertical axes standing upright perpendicular to the transport plane E.

In the illustrated embodiments, the treatment device 3 has first and second treatment positions BP1, BP2, as well as a displacer 6 with at least first, second, and third arms 7, 8, 9, each of which includes a pair of centering elements so that four centering elements 7a, 7b, 8a, 8b, 9a, 9b are used for synchronous and simultaneous displacement of two containers 2.

A transporter 3 conveys containers 2 in the transport direction A along the treatment section BS. A controller causes a motor to stop a container 2 when it is in an engagement region of the displacer 6.

Once the container has been stopped, two of the three arms move into action. In FIG. 3, the first and second arms 7, 8 are moved so as to contact mutually-opposed bearing points A1, A2 on the container's outer surface. The arms 7, 8 are displaced in the direction of these outer surfaces by their respective motor drives M1, M2.

FIG. 3 shows the first and second arms 7, 8 in contact with a container 2.

As the first motor M1 steps the first arm 7 towards the container 2, the controller receives information indicative of the load sustained by the first arm 7. Based on such information, the controller recognizes the existence of a load on the first arm 7. In some embodiments, this load is manifested as a torque. Upon detection of a rise in this torque, the controller recognizes that the centering elements 7a, 7b of the first arm 7 have made contact with the first bearing portion A1 on the container 2.

Some embodiments carry out multi-stage load recognition. In such embodiments, as the second motor M2 steps the second arm 8 towards the container 2, the controller receives information indicative of the load sustained by the second arm 8. Based on such information, the controller recognizes the existence of a load on the second arm 8. In some embodiments, this load is manifested as a torque. Upon detection of a rise in this torque, the controller recognizes that the centering elements 8a, 8b of the second arm 8 have made contact with the second bearing portion A2 on the container 2.

The use of multi-stage load recognition is particularly useful because the displacement of the first arm 7 may be slower than that of the second arm 8 or vice versa.

Some embodiments also include a sensor 3.3 that provides information indicative of the container's geometry from which the container's volume can be determined. Examples of such details of container geometry include the container's outer diameter and its height.

Some embodiments feature sensors SE1, SE2, SE3 for detecting contact of the centering elements 7a, 7b, 8a, 8b, 9a, 9b and the outer surface of the container 2. These pressure sensors SE1, SE2, SE3 provide appropriate signals to the controller for use in controlling the first, second, and third motors M1, M2, M3 accordingly.

In some embodiments, the sensors SE1, SE2, SE3 are pressure sensors. These sensors send a signal to the controller indicative of contact with an arm's contact with the container 2.

In other embodiments, the sensors SE1, SE2, SE3 are position sensors. These position sensors send their relative positions to each other or to the controller as the arms 7, 8. 9 move.

Referring to FIG. 3, the first and second arms 7, 8 move synchronously to move the container 2 onto the first treatment position BP1. In FIG. 3, the second arm 8 is the active arm that pushes the container 2 and the first arm 7 acts as a backstop for the container 2. The first and second arms 7, 8 thus cooperate to guide the container 2 using opposite sides thereof to gently move the container 2 onto the first treatment position, where it comes to rest as shown in FIG. 4.

In the container-displacement process shown in FIGS. 3 and 4, the third arm 9 remains idle at the second treatment position BP2. However, if a further container 2 arrives, the third arm 9 and the second arm 8 will cooperate in the same manner as that described in connection with FIGS. 3 and 4.

It is particularly useful if the container-treatment machine 1 includes plural treatment devices 3 along its treatment section BS. Such a container-treatment machine 1 avoids the need for format parts. This offers numerous advantages.

One advantage is that it is possible to detect and position containers 2 that have become detached from a batch of containers by using their container diameters.

Another advantage is that it becomes possible to center containers of varying diameters on treatment heads that maintain a fixed position at the treatment positions BP1, BP2.

Yet another advantage arises from the ability to intelligently direct containers of varying formats to format-independent treatment positions BP1, BP2 to take advantage of the availability of free treatment heads from a large set of treatment heads in which different treatment heads carry out different processes that have different process times.

Other advantages arise from the ability to implement a reversing positioning system, which releases free treatment devices BP1, BP2, and the ability to adjust treatment processes based on geometric properties of a container 2, such as its volume.

The use of a container-treatment device 1 as described herein promotes more flexible allocation of containers 2 to treatment devices 3. It also means makes it possible to have different processing cycles for different containers 2, with differing speed profiles. Unlike conventional devices, in which format parts require replacement to accommodate containers of different formats, the container-treatment device 1 as described herein permits the construction of a single transporter that can deliver and remove containers with different formats without reliance on format parts. This means that the container-treatment device 1 requires only minimal intervention by operating personnel.

In the container-treatment device 1, it is possible for treatment cycles at different treatment positions BP1, of BP2 to be independent of each other. For example, in a case in which the treatment positions BP1, BP2 are cleaning stations, it is possible for the cleaning fluids and processing times to differ based on the format of the container 2 that is being cleaned. This means that time and materials can be optimized for the particular container 2 being cleaned. In particular, this optimization reduces the amount of cleaning medium required by avoiding the waste of cleaning medium for cleaning containers 2 whose formats do not require copious quantities of cleaning medium.

Yet another advantage arises from the first, second, and third arms 7, 8, 9 being able to continuously guide containers 2 during positioning thereof. This results in shorter process cycles. Additionally, this avoids a need for mechanical intervention to carry out a format change. The absence of intervention by operating personnel thus yields a cost savings in labor. The ability of the container-processing device 1 to adaptively adjust both media consumption and cycle time in response to different formats means achieves cost savings in material and time as well.

In some embodiments, the container-treatment machine 1 has a modular architecture. In such cases, it is possible to extend or shorten the container-treatment machine 1 by adding or removing treatment devices 3. The resulting modular container-treatment machine 1 can include treatment devices 3 such as cleaning devices, filling devices, pre-cleaners, main cleaners, and combination cleaners. It is also possible to integrate treatment devices 3 that carry out such processing steps as decanting, fitting processing, and the fitting and drawing of caps.

Having described the invention and a preferred embodiment thereof, what is claimed as new and secured by Letters Patent is:

1. An apparatus for treating containers, among which is a first container, wherein said apparatus comprises a treatment device, a transporter, and a displacer, wherein said displacer comprises first, second, and third arms, wherein said treatment device comprises first and second treatment positions disposed on either side of said transporter, wherein said transporter defines a transport direction along which said containers are transported, wherein said displacer is provided in a region of said treatment device and configured to be driven by a motor to displace containers from said transporter to said treatment positions and from said treatment positions back to said transporter, wherein said arms are configured to be displaced transverse to said transport direction, wherein said arms are driven independently of one another such that two of said arms contact bearing points on opposite sides of said first container and move synchronously to displace said first container, and wherein said first container is selected from the group consisting of a can, a barrel, and a keg.

2. The apparatus of claim 1, wherein said arms are configured to be displaceable independently of one another in a controlled manner by corresponding motors.

3. The apparatus of claim 2, wherein, a controller recognizes that said first arm has sustained a load and wherein said recognition is used as a basis for controlling a first motor in driving said first arm.

4. The apparatus of claim 1, wherein at points at which said first arm contacts said bearing points, said first arm comprises a centering element, wherein said centering element is brought into contact with said container during displacement thereof.

5. The apparatus of claim 4, further comprising a pressure sensor disposed at said centering element.

6. The apparatus of claim 4, further comprising a position sensor disposed at said centering element.

7. The apparatus of claim 1, wherein said first container is at said first treatment position, said apparatus further comprising an inspector at said first treatment position for optically monitoring said first container.

8. The apparatus of claim 1, wherein said first container has been displaced into said second treatment position, said apparatus further comprising an optical sensor disposed at said second treatment position, wherein said optical sensor is configured to determine a dimension of said first container.

9. The apparatus of claim 8, wherein said optical sensor is configured to determine an outer diameter of said first container.

10. The apparatus of claim 8, wherein said optical sensor is configured to determine a height of said first container.

11. The apparatus of claim 1, further comprising a lock-type access point at said first treatment position.

12. The apparatus of claim 1, further comprising a rail guide, wherein said arms are arranged at said rail guide.

13. The apparatus of claim 12, further comprising a carriage and holding sections, wherein each holding section couples a corresponding one of said arms to said carriage, wherein said rail guide guides said carriage, and wherein a motor drives said carriage along said transport direction.

14. The apparatus of claim 1, wherein said transporter is a constituent part of said treatment device.

15. The apparatus of claim 1, further comprising a container-treatment machine comprising a treatment section, wherein said treatment device is disposed along said treatment section and wherein said treatment device extends transverse to said transport direction.

16. The apparatus of claim 15, further comprising a plurality of treatment devices along said treatment section, wherein said treatment device is one of said plurality of treatment devices.

* * * * *